(12) United States Patent
Bermudez et al.

(10) Patent No.: US 11,550,283 B2
(45) Date of Patent: *Jan. 10, 2023

(54) SYSTEM AND METHOD FOR CONTROL OF SMART APPLIANCE OPERATION

(71) Applicant: Capital One Services, LLC, McLean, VA (US)

(72) Inventors: Sophie Bermudez, Washington, DC (US); Salik Shah, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/088,974

(22) Filed: Nov. 4, 2020

(65) Prior Publication Data
US 2021/0232112 A1 Jul. 29, 2021

Related U.S. Application Data

(63) Continuation of application No. 16/775,403, filed on Jan. 29, 2020, now Pat. No. 10,859,993.

(51) Int. Cl.
*G05B 19/042* (2006.01)
*G06Q 40/02* (2012.01)

(52) U.S. Cl.
CPC .......... *G05B 19/042* (2013.01); *G06Q 40/02* (2013.01); *G05B 2219/2642* (2013.01)

(58) Field of Classification Search
None
See application file for complete search history.

(56) References Cited

U.S. PATENT DOCUMENTS 7,577,571 B2 8/2009 Yui
8,041,605 B1 10/2011 Harrity
(Continued)

FOREIGN PATENT DOCUMENTS

WO 2013/057587 A2 4/2013

OTHER PUBLICATIONS

European Extended Search Report issued in related European Patent Application No. EP 21152697.5, dated Jun. 2, 2021.

*Primary Examiner* — Jason Lin
(74) *Attorney, Agent, or Firm* — Hunton Andrews Kurth LLP

(57) ABSTRACT

In a method of controlling an operational parameter of a smart apparatus, a user processing device receives user-defined criteria for changing the operational parameter based on a financial parameter associated with an account. The user processing device obtains a value for the financial parameter from a financial institution server a value and determines whether the user-defined criteria have been met. Responsive to a determination that the user-defined criteria have been met, the user processing device transmits to the smart apparatus a first instruction to change the operational parameter. The user processing device may then receive an updated value for the financial parameter from the financial institution server and determine whether the user-defined criteria are no longer being met. Responsive to a determination that the user-defined criteria are no longer being met, the user processing device transmits to the smart apparatus a second instruction to change the operational parameter.

17 Claims, 5 Drawing Sheets

(56) References Cited

U.S. PATENT DOCUMENTS

| | | | |
|---|---|---|---|
| 8,296,206 B1 | 10/2012 | Del Favero et al. | |
| 8,355,805 B2 | 1/2013 | Ricket | |
| 10,948,885 B2 * | 3/2021 | Koch | G05B 15/02 |
| 2002/0035552 A1 | 3/2002 | Tsubura | |
| 2004/0133314 A1 | 7/2004 | Ehlers et al. | |
| 2004/0243525 A1 * | 12/2004 | Forrester | G06Q 10/06311 |
| | | | 705/412 |
| 2005/0143865 A1 * | 6/2005 | Gardner | H02J 13/00004 |
| | | | 700/291 |
| 2006/0108417 A1 | 5/2006 | Simon et al. | |
| 2006/0178991 A1 | 8/2006 | Suzuki et al. | |
| 2006/0289553 A1 | 12/2006 | Ehlers et al. | |
| 2007/0038563 A1 | 2/2007 | Ryzerski | |
| 2007/0203860 A1 * | 8/2007 | Golden | H02J 3/14 |
| | | | 705/412 |
| 2008/0096524 A1 * | 4/2008 | True | H04L 12/1457 |
| | | | 455/406 |
| 2008/0167755 A1 | 7/2008 | Curt | |
| 2010/0017249 A1 | 1/2010 | Fincham et al. | |
| 2010/0198643 A1 | 8/2010 | Friedman et al. | |
| 2010/0217726 A1 | 8/2010 | Sargent | |
| 2010/0228601 A1 | 9/2010 | Vaswani et al. | |
| 2011/0046805 A1 * | 2/2011 | Bedros | H04L 12/2829 |
| | | | 700/291 |
| 2011/0288992 A1 | 11/2011 | Needham et al. | |
| 2012/0084134 A1 | 4/2012 | Conrady | |
| 2012/0306882 A1 * | 12/2012 | Kashiwagi | G06T 11/20 |
| | | | 345/440 |
| 2012/0310861 A1 | 12/2012 | Varma et al. | |
| 2012/0323385 A1 * | 12/2012 | Thiruvengada | G05F 1/66 |
| | | | 700/291 |
| 2013/0185194 A1 | 7/2013 | Moore et al. | |
| 2013/0191243 A1 | 7/2013 | Jung et al. | |
| 2013/0214935 A1 | 8/2013 | Kim et al. | |
| 2013/0282624 A1 | 10/2013 | Schackmuth et al. | |
| 2014/0052573 A1 | 2/2014 | Oh et al. | |
| 2014/0244834 A1 * | 8/2014 | Gu | H04W 4/21 |
| | | | 709/224 |
| 2014/0250019 A1 | 9/2014 | Causey et al. | |
| 2015/0073959 A1 | 3/2015 | Connors et al. | |
| 2016/0062381 A1 | 3/2016 | Hughes et al. | |
| 2016/0170428 A1 * | 6/2016 | Ichien | H02J 13/00004 |
| | | | 700/297 |
| 2016/0300229 A1 | 10/2016 | Minnucci | |
| 2016/0337221 A1 | 11/2016 | Cohen et al. | |
| 2016/0338072 A1 | 11/2016 | Cohen et al. | |
| 2017/0115018 A1 | 4/2017 | Mintz | |
| 2017/0161706 A1 | 6/2017 | Patel | |
| 2017/0186074 A1 | 6/2017 | Lee et al. | |
| 2017/0186079 A1 | 6/2017 | Kim et al. | |
| 2019/0156382 A1 | 1/2019 | Khoo et al. | |

* cited by examiner

SYSTEM AND METHOD FOR CONTROL OF SMART APPLIANCE OPERATION

CROSS REFERENCE TO RELATED APPLICATION

This application is a Continuation of U.S. application Ser. No. 16/775,403, filed Jan. 29, 2020, the complete disclosure of which is incorporated herein by reference.

FIELD OF THE INVENTION

This disclosure relates generally to control of smart appliance operation, and, more particularly, to altering operational parameters of smart appliances based on financial account information.

BACKGROUND OF THE INVENTION

Home appliances and vehicles are becoming more and more efficient, largely because of highly sophisticated sensor and control systems. In many cases, these systems allow the mechanical apparatus to be operated in an energy saving "economic" mode. While such operating modes may result in temporary cost savings, they can also be detrimental to the lifespan of the apparatus or can result in lower performance that negatively affects other elements of the home environment.

Home appliances have also gained the capability of connection into a home network. This allows the homeowner to control and monitor appliance operation from a computer or smart phone. This can be highly advantageous for the homeowner who may, at certain times, need to adjust appliance operation to be as economical as possible. As the number of smart appliances and vehicles increase, however, the typical homeowner may not be able to keep track and maintain efficient operation of all of them.

SUMMARY OF THE INVENTION

An illustrative aspect of the invention provides a system for controlling operation of smart apparatus. The system comprises at least one smart apparatus having an apparatus control system, an apparatus communication system in communication with the apparatus control system, and a controllable operational parameter. The system also comprises a user processing device comprising a user device data processor, a network communication interface, an apparatus communication interface, and a memory. The network communication interface is in data communication with the data processor and is configured for communication over a network. The apparatus communication interface is configured for selective communication with the apparatus communication system of each smart apparatus. The user interface comprises a data entry mechanism and a visual display. The memory is accessible by the data processor and has stored therein a financial monitoring application and an apparatus control application. The financial monitoring application is configured to receive, from a financial institution server via the network communication interface, a financial account parameter associated with a financial account. The financial monitoring application is further configured to determine whether the received financial account parameter is outside a user-defined acceptability range. The apparatus control application is configured to, responsive to a determination by the financial monitoring application that the financial account parameter is outside the user-defined acceptability range, establish communication with at least one of the at least one smart apparatus via the apparatus communication system, and transmit to the at least one of the at least one apparatus control system a user-specified instruction with respect to the operational parameter of said each of the at least one apparatus control system.

Another aspect of the invention provides a method for controlling an operational parameter of a smart apparatus. The method comprises receiving, by a user processing device, user-defined criteria for changing the operational parameter based on a financial parameter associated with an account. The method further comprises obtaining, by the user processing device from a financial institution server, a value for the financial parameter and determining, by the user processing device using the financial parameter, whether the user-defined criteria have been met. Responsive to a determination that the user-defined criteria have been met, the user processing device transmits to the smart apparatus a first instruction to change the operational parameter. The method may further comprise periodically obtaining, by the user processing device from the financial institution server, an updated value for the financial parameter and determining, by the user processing device using the financial parameter, whether the user-defined criteria are no longer being met. Responsive to a determination that the user-defined criteria are no longer being met, the user processing device transmits to the smart apparatus a second instruction to change the operational parameter.

Another aspect of the invention provides a mobile control device for controlling an operational parameter of a smart apparatus. The mobile control device comprises a data processor, a network communication interface, a user interface, an apparatus communication interface and a memory. The network communication interface is in communication with the data processor and is configured for selective communication with a financial institution server via a network. The user interface comprises a data entry mechanism and a visual display. The apparatus communication interface is configured for selective communication with the smart apparatus. The memory is accessible by the data processor and has stored therein an apparatus control application configured to receive and store user-defined criteria for changing the operational parameter based on a financial parameter associated with an account. The apparatus control application is further configured to receive, from the financial institution via the network and the network communication interface, a value for the financial parameter and determine whether the user-defined criteria have been met. Responsive to a determination that the user-defined criteria have been met, the application causes the mobile control device to transmit to the smart apparatus, an instruction to change the operational parameter.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides a system and method for automatically altering the operation of a smart appliance, vehicle, or other apparatus depending on financial information from a user's account. Embodiments of the invention make use of an application installed on an account-associated user device that periodically or upon demand obtains financial account information from an information system of the account administrator. The application then compares this information to user-supplied criteria to determine if the operations of any the user's smart apparatus should be adjusted to more economical operating modes. Some embodiments of the invention provide methods of balancing economic operation criteria with potentially harmful effects on the apparatus or other environmental elements.

Figure 1:
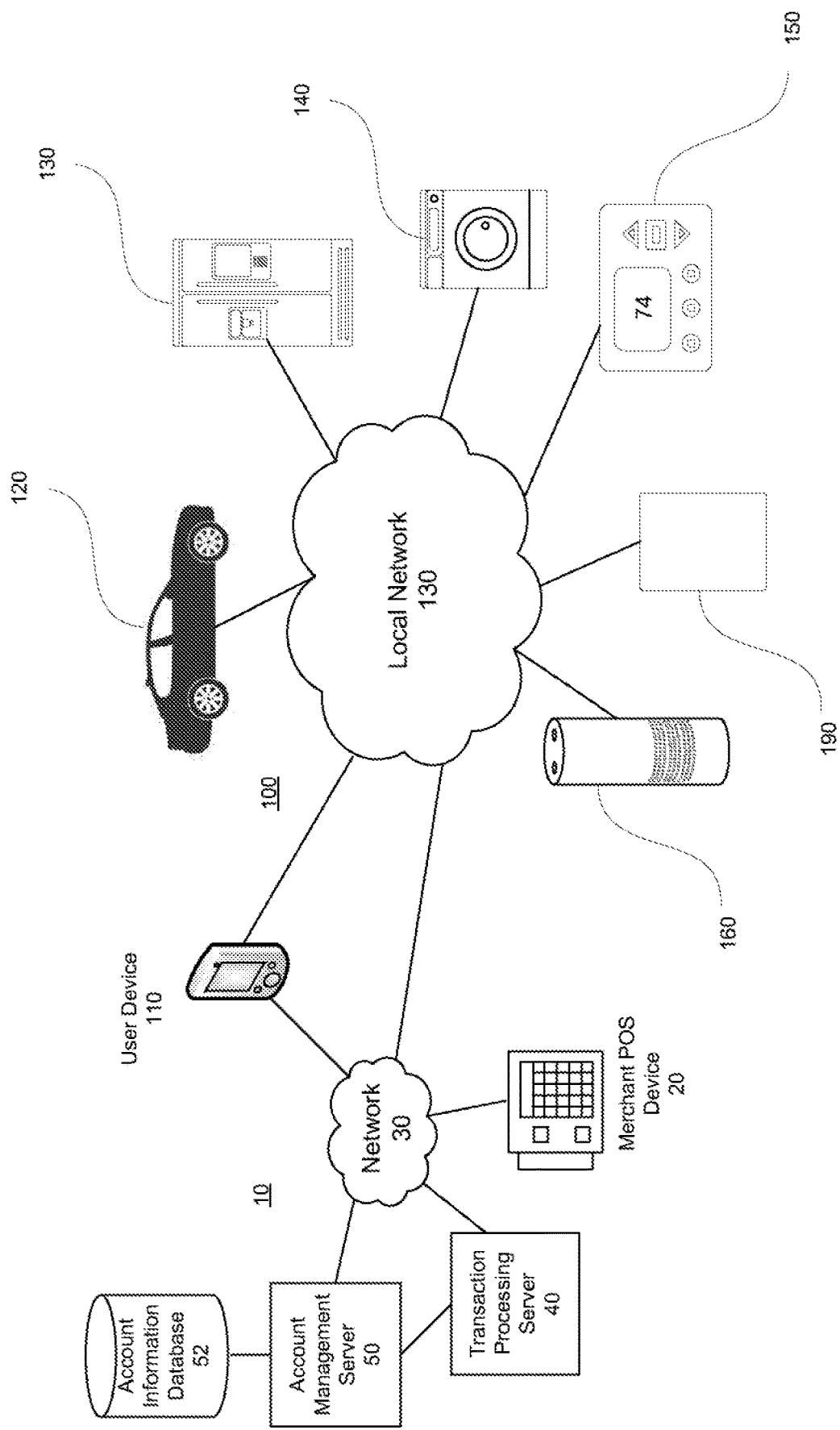
FIG. 1 is a schematic representation of a system for controlling operation of smart apparatus according to an embodiment of the invention.

The methods of the invention can be implemented in conjunction with any financial transaction processing and monitoring system. FIG. 1 depicts a smart apparatus control system 100 according to an embodiment of the invention that is usable in conjunction with a typical transaction processing and monitoring system 10. The transaction system 10 may include various network-enabled computer systems configured for processing transactions involving a plurality of accounts administered by a financial institution or merchant. The system 10 may include, as depicted in FIG. 1 for example, one or more merchant transaction processing devices 20, a transaction processor 40, and an account management server 50, all capable of communicating with on another via a network 30.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated by the invention may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

In the example embodiments presented herein, an account holder may be any individual or entity permitted to conduct a transaction (which may be, but is not limited to a financial transaction) using a transaction account. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. An account holder may be a transaction processing entity such as a financial institution, credit card provider, or other entity that offers accounts to customers.

A transaction account may be associated with one or more transaction cards (e.g., debit cards, credit cards, or prepaid account cards). Alternatively or in addition, the transaction account may be associated with one or more account holder processing devices or simply associated with a unique identifier enterable by an account holder to facilitate a transaction. The processing devices may be configured to act as a method of payment at a POS location using, for example, NFC or any other mobile payment technology. In some embodiments, separate cards or user devices may be associated with individual account co-holders.

A merchant transaction processing device 20 may be any network enabled processor configured for carrying out a transaction with an account holder or co-holder. As used herein, a merchant is any entity with which an account holder carries out a transaction. This may include without limitation any retailer, wholesaler, or bartering entity. A merchant may have one or more physical locations or may be an online retailer. The merchant transaction processing device 20 may be any network enabled device (e.g., cash register or other POS terminal or an online transaction server) capable of carrying out the transaction and communicating with the transaction processor 40. In particular, the merchant device 20 may be configured for transmitting transaction information to the transaction processor 40, the information including, at least, an account identifier, a transaction type, and a transaction amount.

The transaction processor 40 is a network-enabled system configured for receiving transaction information from a merchant device 20 or other system such as a user device 110, identifying the account associated with the transaction and processing the financial transaction on the account. The transaction processor 40 may also be configured to transmit transaction or account information to the account management server 50 via the network 30 or other network. The account management server 50 is a network-enabled processing system configured for managing account information. The account management server 50 may, in particular, be configured for storing account information in an account information database 52. The account management server 50 may also be configured for retrieving information for a particular account from the account information database and transmitting it, via the network 30, to a user device 100 associated with the account. The account information may include, but is not limited to, a current account balance, a previous account balance, information on recent transactions, and projected or scheduled transactions (e.g., automatic deposits or withdrawals). The account management server 50 may be configured to transmit account information on a periodic basis and/or upon occurrence of a transaction or other change to the account. The account management server 50 may also be configured for receiving a request for account information from a user device 100, for validating the authorization of the requesting user device 100 to receive the requested information, and for retrieving and transmitting the requested information to the user device 100 via the network 30.

The network 30 may be any form of communication network capable of enabling communication between the transaction entities and the transaction information system 100. For example, the network 30 may be one or more of a wireless network, a wired network or any combination of wireless network and wired network. The network 30 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 30 may utilize one or more protocols of one or more network elements to which it is communicatively coupled. The network 30 may translate to or from other protocols to one or more protocols of network devices. Although the network 30 is depicted as a single network, it will be appreciated that it may comprise a plurality of interconnected networks, such as, for example, the Internet, a service provider's network, a cable television network, corporate networks, and home networks.

The smart apparatus control system 100 comprises a user processing device 110 and one or more smart appliances or other apparatus. In the illustrative example of FIG. 1, the smart apparatus of system 100 includes a vehicle 120, a refrigerator 130, a clothes washer 140, a heating and cooling system 150, and a generic smart appliance 190. Each of these apparatus may be connected to a local network 130 to which the user device 110 is also connected. The apparatus control system 100 may also comprise a "smart speaker" in communication with the network 130.

Figure 2:
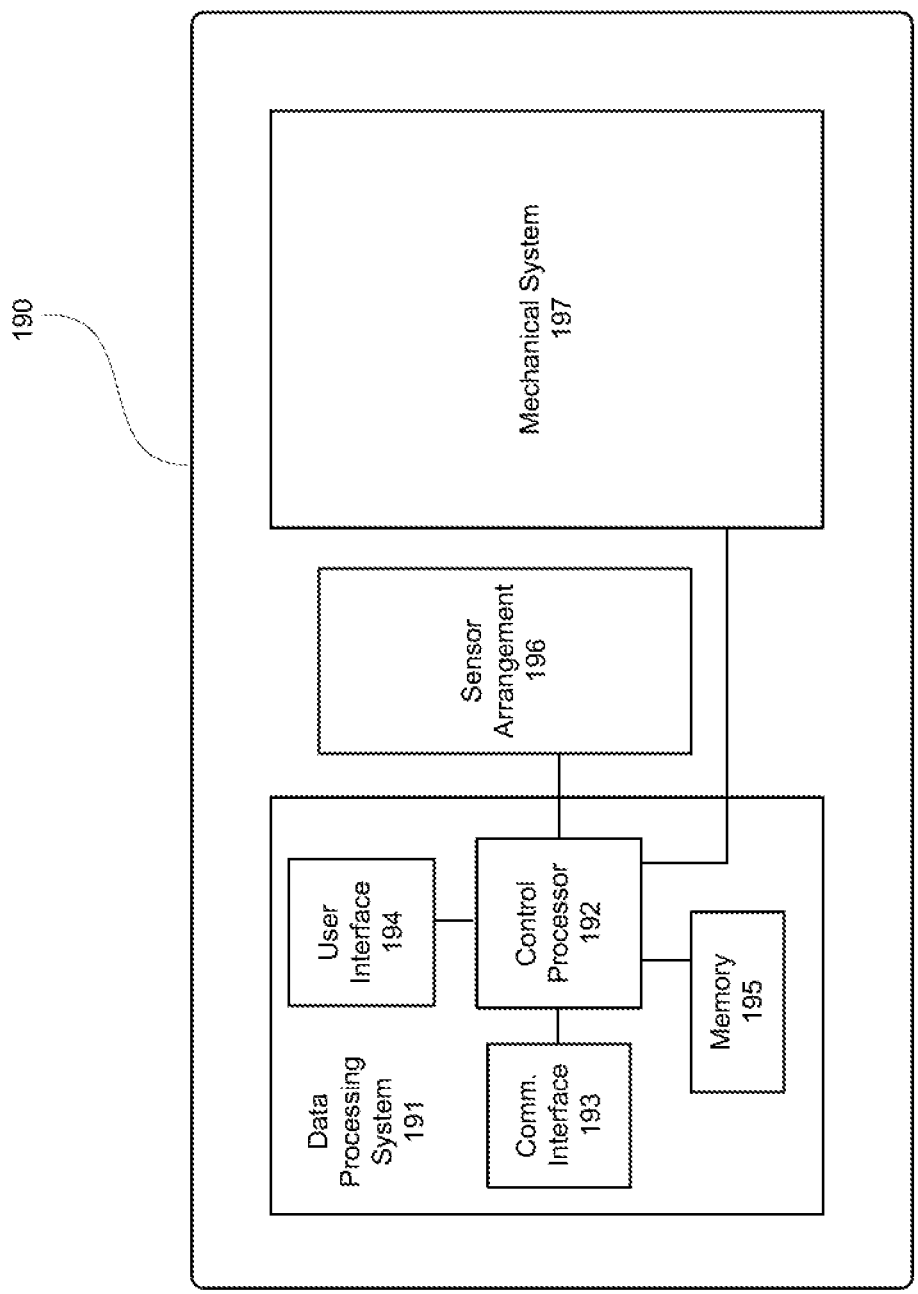
FIG. 2 is a schematic representation of a smart apparatus usable in conjunction with methods of the invention.

As used herein, the term smart apparatus is used to refer to any controllable vehicle, appliance, or other mechanism or system that has a data processing system that can receive control instructions from a user data processing device (such as user device 110) either through direct wired or wireless communication or via a network (such as network 130). With reference to FIGS. 1 and 2, the generic smart apparatus 190 can be used to describe features that may be common to various smart apparatus usable in the systems of the invention. As shown in FIG. 2, the smart apparatus 190 comprises a data processing system 191 and one or more mechanical systems 197. The mechanical system or systems 197 encompass all the operational hardware of the apparatus 190 that allow it to perform its function. In an appliance such as a refrigerator, this would include all of the primary and secondary mechanisms and power supply systems for cooling the enclosed compartments. In a washer, it would include all of the mechanisms for filling, agitating, spinning and draining the wash drum. In a vehicle, it would include a variety of systems for powering, steering, braking, cooling, etc.

The data processing system 191 comprises the elements for controlling the operation of the mechanical system 197. These may include a control processor 192 configured for monitoring and controlling one or more operational parameters of the mechanical system 197. Such parameters may be as simple as "on or off" or more complex such as the parameters associated with a wash cycle in a washer (e.g., control and timing of water filling and draining, water temperature, agitation cycling, etc.). Operational instructions for the control processor 192 may be stored in a memory module 195. These instructions may be a combination of permanently stored instructions and temporary, user-supplied instructions.

In many instances, the memory 195 may have stored therein predetermined operational modes from which a user may select. Qualitatively speaking, these could include, for example, the equivalents of a "normal" operating mode, a "high performance" or "heavy duty" operating mode, and an "economy" operating mode. Each of these may have an associated cost in terms of energy or other research usage with the high performance mode typically producing the highest costs and the economy mode producing the lowest. While the operating mode may determine how the apparatus functions, it may be independent of other user-specified parameters. For example, in a heating system, the user may specify a particular room temperature and an operating mode. The control processor 192 would operate the system 197 in a manner to reach and maintain the specified temperature in accordance with the operating mode. If operating in an high performance mode, the system 197 might reach the specified temperature very quickly, but at the cost of additional energy usage. Operating in the economy mode, the system 197 might reduce energy usage but might also take longer to reach the specified temperature.

The memory 195 may also have stored therein operational restrictions that prevent operation of the mechanical system 197 under predetermined circumstances (e.g., an over-heating condition or excessive current draw). These could require, for example, the control processor 192 to alter the operational mode of the mechanical system 197 or even shut it down completely.

User input to the data processing system 191 is received through the use of a user interface 194, which may be or include any device for entering information, control input, and instructions into the system 191. In many cases, the user interface 194 may be a combination of buttons and/or dials having preset control functions. In some apparatus, the user interface 194 may include more complex devices such as a touch-screen, keyboard, mouse, cursor-control device, microphone, stylus, or digital camera. The user interface 15 may also include lighted indicators, numerical displays or graphic displays for presenting visual information.

The data processing system 191 also includes a communication interface 193 in communication with the control processor 192 and configured for communication over one or more networks such as the local network 130 and the network 30. In particular, the communication interface 193 may be configured to allow the control processor 192 to transmit to and receive transmissions from the user device 110 via the local network 130. In some embodiments, the communication interface 193 may be configured to support communication with a short-range wireless communication interface, such as near field communication (NFC), radio-frequency identification, and Bluetooth.

The smart apparatus 190 may include a sensor arrangement 196 in communication with the control processor 192. The sensor arrangement 196 may be configured for monitoring one or more operational parameters of the mechanical system 197 and/or a measurable parameter of the environment in which the apparatus 190 is operating. In the case of a refrigerator, for example, the sensor arrangement 196 could include temperature sensors for monitoring the temperature in various compartments of refrigerator. In a home heating system, the sensor arrangement 196 could include a room air temperature sensor. The sensor arrangement 196 may also include sensors for monitoring a condition or operating characteristic of the mechanical system 197. This could include, for example, a sensor for measuring an internal machine temperature that could, if it exceeds a certain level, result in damage to the apparatus. Sensor measurement information is transferred from the sensor arrangement 196 to the control processor 192, which uses it to control operation of the mechanical system 197.

Figure 3:
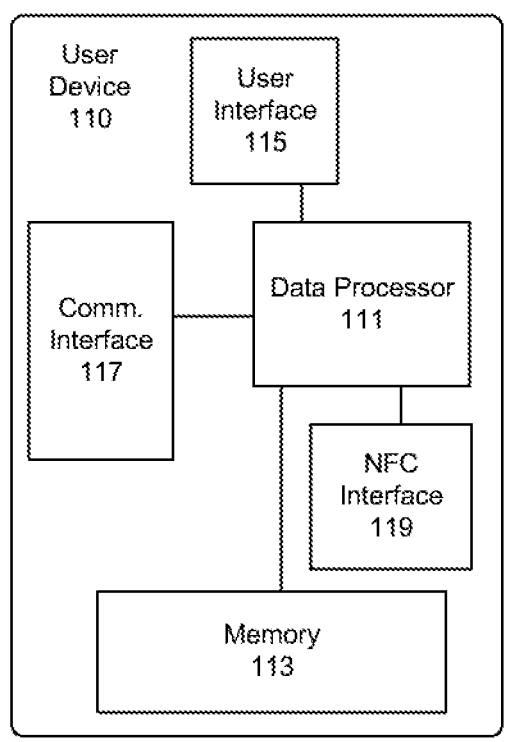
FIG. 3 is a schematic representation of a user processing device usable in conjunction with methods of the invention.

With reference to FIGS. 1 and 3, an account holder or user interface device 110 may be any data processing and/or communication device that an account holder uses to carry out a transaction and/or to receive notifications from the transaction processor 40 or the including, but not limited to a smartphone, a laptop, a desktop computer, and a tablet. In particular embodiments, the account holder device 110 includes an on-board data processor 111 in communication with a memory module 113, a user interface 115, and a communication interface 117. In some embodiments, the account holder device 110 may include an image capturing device (e.g., a digital camera). The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the user device 110 can include one or more of these memories.

The user interface 115 includes a user input mechanism, which can be any device for entering information and instructions into the account holder device 110, such as a touch-screen, keyboard, mouse, cursor-control device, microphone, stylus, or digital camera. The user interface 115 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 115 is configured to establish and support wired or wireless data communication capability for connecting the device 110 to the broad network 30, the local network 130, or other communication network. The communication interface 115 can also be configured to support communication with a short-range wireless communication interface, such as near field communication (NFC), radio-frequency identification, and Bluetooth.

In embodiments of the invention, the memory 113 may have stored therein one or more applications usable by the data processor 111 to conduct and/or monitor transactions on a transaction account between the account holder device 110 and a merchant device 20 or other device over the network 30. These applications may include instructions usable by the data processor 111 to identify transaction events, store event data in the memory 113, and communicate event data to the transaction processing server 40 and/or the account management server 50. Some applications may also include instructions relating to receiving and interpreting notifications and/or instructions from the transaction processor 40 or account management server 50.

In particular embodiments, the memory 113 may have stored therein an financial monitoring application configured for receiving account information from the account management server 50. The account information may include information on any account parameter including, but not limited to, a current account balance, average account balance, project account balance, expenditures over a time interval or since a beginning date of a time interval (e.g., the first day of the month). The account information may also include information such as a previous account balance, information on recent transactions, information on projected or scheduled transactions (e.g., automatic deposits or withdrawals), and payments to particular merchants.

The account information may be received from the account management server 50 on a periodic basis and/or upon occurrence of a transaction or other change to the account. The financial monitoring application may be further configured to transmit requests for account information on a periodic basis, on particular dates relative to other events (e.g., anticipated payment due dates or account deposits) or upon occurrence of specific transaction events identified by the data processor 111. Account information requests may also be initiated by the account holder through the application.

The financial monitoring application may be configured with instructions for the data processor 111 to use received account information to determine if a particular account parameter meets account holder-specified acceptability criteria. In the simplest case, such criteria could be based on the parameter falling within an acceptability range set by the account holder. For example, the account holder may specify an account balance threshold. Any account balance above this threshold would be deemed acceptable. If the balance falls below the threshold, the application would identify it as unacceptable. A more complex example would be an account balance threshold that varies depending on the time of the month. For example, an account balance that would be unacceptable early in the month may be considered acceptable later in the month. Acceptability criteria could also vary depending on other factors such as the time of year.

The financial monitoring application may be configured to display an alert to the account holder when an account parameter is determined to be in an unacceptable range. The application may also be configured to take additional actions including initiation of action by other applications.

The user device memory 113 may also have stored therein a smart apparatus control application configured with instructions for the data processor 111 to construct and transmit control instructions to one or more of the smart apparatus 120, 130, 140, 150, 160, 190 via the local network 130. The application may be configured to tailor these instructions according to information stored in the memory 113 for the apparatus being controlled. The instructions associated with a generic apparatus 190 may include instructions for displaying prompts to the account holder for and receiving from the account holder via the user interface 115 control input information for the apparatus 190. The control input information may include an operation mode selection, specification of one or more operational parameters, and/or one or more desired apparatus output parameter. The control application may be configured to instruct the data processor to receive the control input information and construct apparatus control instructions and transmit them to the data processing system 191 of the apparatus 190 via the local network 130. In some embodiments, the control instructions may be transmitted to the apparatus 190 via the network 30 or via the network 30 to a local area server and then via the local network 30. The apparatus control instructions may include an instruction to set or change an operational parameter of the apparatus 190.

The control application 190 may be further configured with instructions for receiving operation information from the data processing system 191 of the apparatus 190. The application may be configured to review this information and determine whether to display some or all of the information to the account holder via the user interface 115. In some embodiments, the control application may be configured to prompt for and receive additional control input information in response to the operation information received from the apparatus 190.

In particular embodiments of the invention, the apparatus control application may include instructions configured for constructing and transmitting to the data processing system 191 of the apparatus 190 a control change instruction in response to the occurrence of an event meeting user-specified control change criteria. These instructions may include instructions to receive the control change criteria from the account holder via the user interface 115 and store them in the memory 113. Control change criteria may specify the conditions or ranges of measured or otherwise received parameters under which the control parameter of the apparatus 190 should be changed. Such criteria may be associated with any event or parameter monitored by the data processor 111. Control change criteria may be associated, in particular, with financial information such as the account information received from the account management server 50. In a particular example, the control change criteria may specify a range for a financial parameter (e.g., account balance). In a specific example, the control criteria may include a minimum account balance threshold. In this example, the change criteria would be met if the account balance falls below the threshold.

The apparatus control application may also include instructions configured to receive from the account holder information on the operational parameter or parameters of the apparatus 190 that should be changed in response to the control change criteria being met and how. This could include, for example, the adjustment of a single parameter (e.g., a minimum or maximum temperature setting for a thermostat) or multiple parameters, or a change from one preset operating mode to another (e.g., a change from a normal operating mode to an economy operating mode). The application may also include instructions to receive criteria for changing operational parameters back to their pre-change settings. This could include, for example, a second account balance threshold (equal to or greater than the first threshold). In this example, the return criteria would be met if the account balance were to rise above the second threshold.

It will be understood that the control change criteria may be different for different smart apparatus.

Either the financial monitoring application or the apparatus control application may include instructions to the control processor 192 for comparing financial parameter information obtained from the account management server 50 to control change criteria for each smart apparatus 110, 120, 130, 140, 150, 160, 190. In some embodiments, a determination that control change criteria are met, may also be considered a failure to meet acceptability criteria. The apparatus control application may be configured so that, in response to a determination that the control change criteria for an apparatus have been met, the application causes a parameter change instruction to be transmitted to the apparatus. This instruction identifies the parameter or parameters (or operating mode) to be changed and the new values specified by the account holder.

The user device memory 113 may also have stored therein an apparatus operation monitoring application having instructions configured for receiving information on the operation of an apparatus to determine if automated changes to its operation may be having a negative or unintended effect on the apparatus. This may include instructions to receive and evaluate operation information from any or all of the apparatus 110, 120, 130, 140, 150, 160, 190. Such operation information may include information on one or more measured operational parameters for the apparatus and/or measured environment parameters. In some embodiments, this information may be used by the apparatus control application or financial monitoring application in determining whether control criteria are being met. It may also be used to determine if control change instructions should be canceled, modified, or otherwise overridden. This determination may be made based on override criteria stored in the memory 113. In some embodiments, the data processor 111 may receive information on one or more operational parameters from the control processor 192 of an apparatus 190 and compare the information to the override criteria. Responsive to the operational parameter information meeting the override criteria, the control processor may transmit override instructions to the apparatus 190. These instructions may include an instruction to change one or more of the operational parameters back to a previous or new value, to change the operating mode of the apparatus 190 to a default operating mode, or, in some cases, to shut down the apparatus.

In particular embodiments, the apparatus operation monitoring application may be configured to obtain from the smart apparatus 190 one or more apparatus operation measurements and determine if any of the operation measurements is outside predetermined operation parameter acceptability limits. Responsive to a determination that an apparatus operation measurement for a particular smart apparatus is outside predetermined operation parameter acceptability limits, the application may cause the user device 110 to display a warning message to the user and/or transmit to the smart apparatus an instruction to change its controllable operational parameter or to turn off the apparatus.

In some embodiments, the control application may include instructions for the control processor 111 to use financial parameter information and operational parameter information along with empirical life expectancy and/or cost information for an apparatus 190 to determine an optimized set of operational parameters for that apparatus 190. The optimized set of operational parameters can then be included in change control instructions transmitted by the data processor 111 to the control processor 192 of the apparatus 190.

Figure 4:
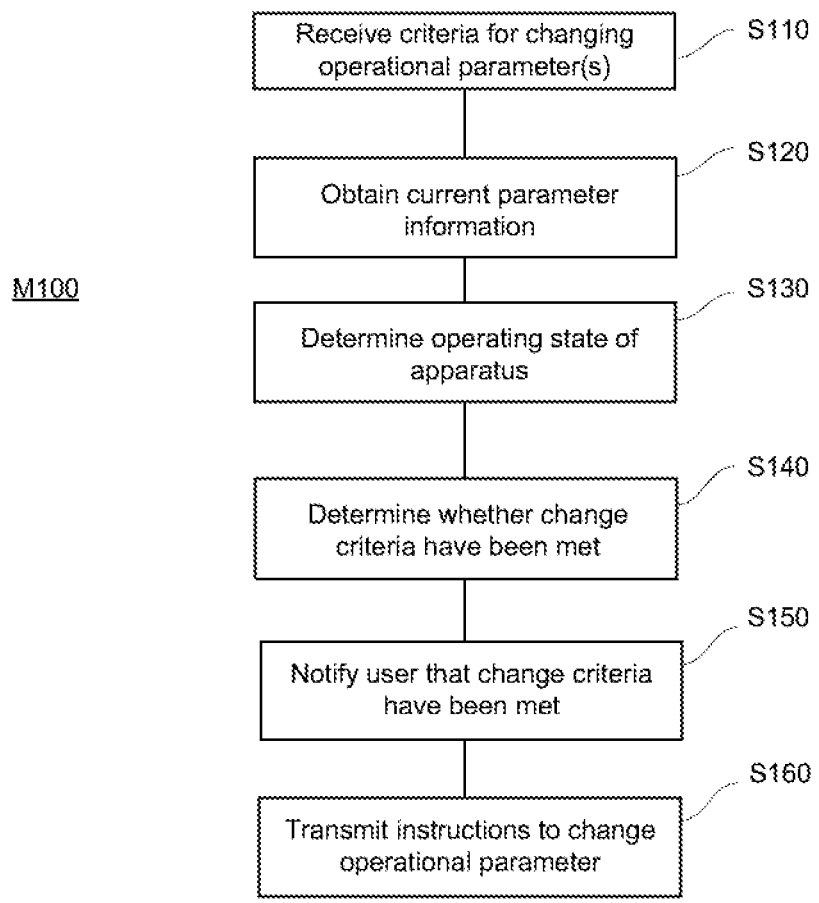
FIG. 4 is a flow chart of a method of controlling an operational parameter of a smart apparatus according to an embodiment of the invention.

FIG. 4 is a diagram of a method M100 of controlling an operational parameter of a smart apparatus according to an embodiment a the invention. The smart apparatus may be any appliance, vehicle or system having attributes such as those of the generic apparatus 190 of FIG. 1. The actions of method M100 may be carried out on a user device such as the device 110 of FIG. 1. The method M100 includes, at S110, receiving user-defined criteria for changing the operational parameter based on a financial or other parameter.

This action may include displaying prompts for information on a display of the user device and receiving user-supplied inputs via a user input device. Change criteria may be received for one or more operational parameters associated with the smart apparatus and will include, for each operational parameter, identification of the specific conditions under which the operational parameter should be changed and how. The change criteria may, in particular, specify that the operational parameter be changed upon the financial or other parameter falling within a specified range. In particular embodiments, the change criteria may identify a specific financial parameter associated with an account a the user. In many cases, this financial parameter will be an account balance. In some embodiments, the change criteria may also specify a particular status of the apparatus. This could include, for example, a requirement that the apparatus be operational, that an operational parameter of the apparatus be in a particular range, or that the apparatus be operating in a particular mode.

At S120, the user device obtains a current value for one or more financial or other parameters for use in determining whether the change criteria have been met. In particular embodiments where these are financial parameters, the user device may obtain the current values from a financial institution or other account management entity. The user device may, in particular, receive one or more financial parameters from an account management server such as previously described. The financial parameter values may be received as part of a periodic transmission from the management server or may be received in response to a request transmitted to the server by the user device.

At S130, the user device may optionally establish communication with the control processor of the smart apparatus to obtain information on the current operating status of the apparatus. This information may include information on current operational parameters and/or a current operating mode of the apparatus. It may also include environment information obtained by a sensor system of the apparatus. In some embodiments of the invention, further actions of the method may be suspended depending on the operational status. At S140, the user device determines whether the user-supplied change criteria have been met. This may include comparing the received parameter value (or values) to the user-supplied change criteria. In a typical embodiment in which the change criteria specify an account balance range (e.g., a range from zero to a change threshold value), the user device would receive financial information for the account including the account balance. If the account balance falls within the specified range (e.g., is less than the change threshold value), the change criteria would be deemed to have been met. In embodiments where the change criteria include requirements with respect to the operational state of the apparatus, the action of determining whether the change criteria have been met may be based, at least in part, of current operating status information obtained from the apparatus.

Responsive to a determination that the change criteria have been met, the user device may optionally display a notification to the user at S150. This notification may note the specifics of the event. For example, the user device could display the parameter or parameters involved and the change criteria that have been net. In the account balance example, for instance, the user device could note that the account balance has fallen below the change threshold value. The notification could further indicate an intent to change one or more operating parameters of the smart apparatus. In some embodiments, the user may be presented with the option of canceling the prospective operational change. In such embodiments, the user device would take no further action unless the user confirmed that the change should be effected.

Further in response to the change criteria having been met (and, in certain embodiments as described above, receiving a change confirmation from the user), the user device transmits to the smart apparatus at S160 an instruction to change one or more operational parameters of the apparatus. In some embodiments, the change instruction may be in accordance with a specific user-supplied direction. Such an instruction may, for example, be to change an operating parameter to a specific pre-established value. In some embodiments, this instruction will direct the apparatus to change from one operating mode to another (e.g., from a normal mode to an economy mode).

In some embodiments, the parameter change instruction may be constructed by the user device based on received parameter information and on operational information received from the apparatus. For example, the user device may use an empirical model to determine a parameter value based on the current parameter value and one or more operational parameter values. Such a model may also use additional information such as the age or usage history of the apparatus. In a particular example, the parameter change may be the result of an optimization routine that trades off current savings from, for example, operation in an economy mode and the additional expected costs due to impact of such operation on the life expectancy and/or future operational efficiency of the apparatus.

It will be understood that if a determination is made at S140 that the change criteria are not met or, in some embodiments, if the user fails to confirm that a change should be effected, additional actions of the method may be suspended. Whether a change is effected or not, the user device may periodically or upon request by the user, repeat the actions at S120, S130, and S140. If no change has been effected, these actions would be identical to those of the previous pass through. If a change has been effected, these actions will be used to determine if a further change should be made. Such a change could be to further adjust operating parameters of the apparatus or to reverse the original change and place the apparatus back in the operational state it was originally in. In some embodiments, however, different change criteria may be used to determine if a change reversal is to be made. For example, if a change was made because an account balance fell below a threshold value, the criteria for reversing the change could be a second threshold value higher than the first.

Figure 5:
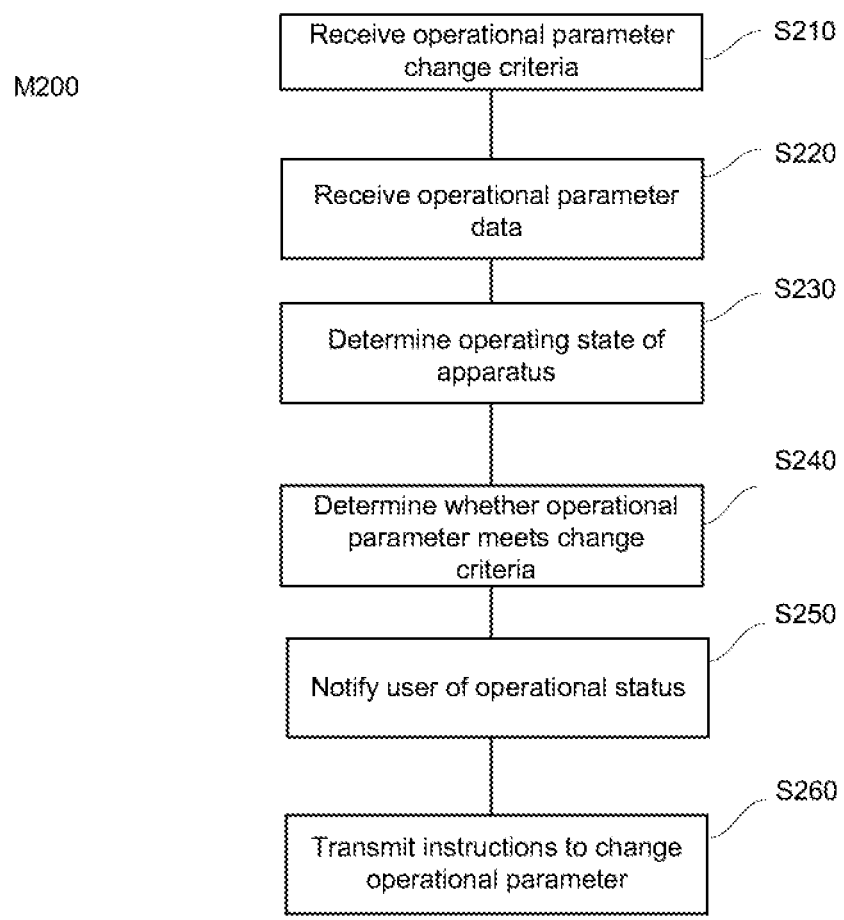
FIG. 5 is a flow chart of actions in a method of controlling operation of a smart apparatus according to an embodiment of the invention.

FIG. 5 illustrates actions in a method M200 of controlling a smart apparatus that can be used in conjunction with the above-described method M100. The method M200 provides for externally managed control over operational parameters of a smart appliance based on information provided by the appliance itself. Among other things, this allows the user device or the user to counter a potential negative impact of other changes to the operation of the apparatus. As before, the smart apparatus may be any appliance, vehicle or system having attributes such as those of the generic apparatus 190 of FIG. 1. The actions of method M100 may be carried out on a user device such as the device 110 of FIG. 1. The method M200 includes, at S210, receiving user-defined criteria for changing one or more operational parameters of the apparatus. This action may include displaying prompts for information on a display of the user device and receiving user-supplied inputs via a user input device. Change criteria may be received for one or more operational parameters associated with the smart apparatus and will include, for each operational parameter, identification of the specific conditions under which the operational parameter should be changed and how. The change criteria may, in particular, specify that the operational parameter be changed upon a measured operational parameter of the apparatus falling within a specified unacceptability range. At S220, the user device receives operational parameter data from the apparatus (e.g., via transmission over a local network). Such data may be transmitted by the apparatus on a periodic basis or may be provided in response to a request transmitted to the control processor of the apparatus by the user device. At S230, the user device may use the operational parameter data and/or other information to determine an operational state of the apparatus. At S240, the user device may compare the operational state and/or a value of a specific operational parameter to the change criteria to determine if the change criteria have been met. Responsive to the change criteria having been met, the user device may optionally display a notification to the user device. This notification may include a description of the operational state of the apparatus and an indication that this state is outside acceptable operating conditions. The notification may also include an indication of a prospective change to one or more operating parameters of the apparatus. In some embodiments, the user may be requested to confirm that the prospective change should be made. Further in response to the change criteria being met and, if applicable, in response to receiving change confirmation from the user, the user device transmits instructions to the apparatus to change one or more operating parameters. In some embodiments, the change instruction may be in accordance with a specific user-supplied direction. Such an instruction may, for example, be to change an operating parameter to a specific pre-established value. In some embodiments, this instruction will direct the apparatus to change from one operating mode to another (e.g., from a normal mode to an economy mode).

It will be understood that if a determination is made at S240 that the change criteria are not met or, in some embodiments, if the user fails to confirm that a change should be effected, additional actions of the method may be suspended. Whether a change is effected or not, the user device may periodically or upon request by the user, repeat the actions at S220, S230, and S240.

The present invention provides a significant improvement in the operation of home appliances vehicles, and other apparatus by providing automatic adjustment of their operating parameters based on the state of a homeowner's bank account or based on other financial or other parameters. It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method for controlling an operational parameter of a smart apparatus, the method comprising:
   receiving, by a user processing device, user-defined criteria for changing the operational parameter based on a financial parameter associated with a bank account administered by a financial institution;
   obtaining, by the user processing device from a financial institution server of the financial institution, a value for the financial parameter;
   determining, by the user processing device using the financial parameter, that the user-defined criteria have been met; and responsive to the determination that the user-defined criteria have been met, transmitting, by the user processing device to the smart apparatus, a first instruction to change the operational parameter,
   wherein the user-defined criteria include at least one of the set consisting of a first specification that a date associated with the financial parameter falls within a predetermined date range and a second specification that a date associated with the financial parameter does not fall within a predetermined date range prior to a date of an upcoming deposit into the bank account.

2. A method according to claim 1 further comprising:
   further responsive to the determination that the user-defined criteria have been met,
      periodically obtaining, by the user processing device from the financial institution server, an updated value for the financial parameter and determining, by the user processing device using the updated value for the financial parameter, whether the user-defined criteria are no longer being met, and
      responsive to a determination that the user-defined criteria are no longer being met, transmitting, by the user processing device to the smart apparatus, a second instruction to change the operational parameter.

3. A method according to claim 2 wherein the second instruction is a reversal of the first instruction.

4. A method according to claim 1 wherein
   the smart apparatus has a normal mode of operation in which its controllable operational parameter is in a first range and an economic mode of operation in which its controllable operational parameter is in a second range; and
   the first instruction is to switch from the normal mode of operation to the economic mode of operation.

5. A method according to claim 1 wherein
   the financial parameter is a bank account balance and
   the user-defined criteria includes a specification that the bank account balance is below a threshold value.

6. A method according to claim 1 wherein the smart apparatus is one of the set consisting of a home appliance, an electrical system, a climate control system, and a vehicle.

7. A system for controlling operation of smart apparatus, the system comprising:
   a smart apparatus having an apparatus control system, an apparatus communication system in communication with the apparatus control system, and a controllable operational parameter;
   a user processing device comprising a user device data processor,
   a network communication interface in data communication with the data processor and configured for communication over a network,
   an apparatus communication interface configured for selective communication with the apparatus communication system of the smart apparatus,
   a user interface comprising a data entry mechanism and a visual display, and
   a memory accessible by the data processor and having stored therein
   a financial monitoring application configured to receive, from a financial institution server via the network communication interface, a financial account parameter associated with a bank account, determine whether the received financial account parameter is outside a user-defined acceptability range, an apparatus control application configured to responsive to a determination by the financial monitoring application that the financial account parameter is outside the user-defined acceptability range, transmit to die apparatus control system a user-specified instruction with respect to the controllable operational parameter of the smart apparatus, wherein the user-defined criteria include at least one of the set consisting of a first specification that a date associated with the financial account parameter falls within a predetermined date range and a second specification that a date associated with the financial account parameter does not fall within a predetermined date range prior to a date of an upcoming deposit into the bank account.

8. A system according to claim 7 wherein the smart apparatus is one of the set consisting of a home appliance, an electrical system, a climate control system, and a vehicle.

9. A system according to claim 7 wherein the apparatus control application includes a user input routine configured to
display a prompt to input the user-defined acceptability range for the financial account parameter;
receive, via the user interface, the user-defined acceptability range;
display a prompt to input the user-specified instruction for each of the at least one smart apparatus; and
receive, via the user interface, the user-specified instruction for each of the at least one smart apparatus.

10. A system according to claim 7 wherein the user-defined acceptability range consists of any value over a financial parameter threshold value.

11. A system according to claim 7 wherein the financial account parameter is a bank account balance.

12. A system according to claim 7 wherein
the smart apparatus has a normal mode of operation in which the controllable operational parameter is in a first range and an economic mode of operation in which the controllable operational parameter is in a second range; and
the user-specified instruction is to switch from the normal mode of operation to the economic mode of operation.

13. A system according to claim 7 wherein
the financial monitoring application is further configured to
after a determination has been made that the financial account parameter has fallen outside the user-defined acceptability range, continue to monitor the financial account parameter to identify a return of the financial account parameter to a value within the user-defined acceptability range, and
the apparatus control application is further configured to
responsive to identification by the financial monitoring application that the financial account parameter has returned to a value within the user-defined acceptability range,
transmit to the apparatus control system a second instruction with respect to the operational parameter of the apparatus control system.

14. A system according to claim 13 wherein the second instruction is a reversal of the first instruction.

15. A system according to claim 7 wherein the financial monitoring application is further configured to
responsive to a determination that the financial account parameter is outside the user-defined acceptability range,
display, via the user interface, an indication that the financial account parameter is outside the user-defined acceptability range and a request for confirmation that the user-specified instruction should be sent to the smart apparatus, and
receive, via the user interface, a response to the request for confirmation,
wherein the action to transmit a user-specified instruction is taken only upon receiving a positive response to the request for confirmation.

16. A mobile control device for controlling an operational parameter of a smart apparatus, the device comprising:
a data processor;
a network communication interface in communication with the data processor and configured for selective communication with a financial institution server via a network;
a user interface comprising a data entry mechanism and a visual display;
an apparatus communication interface configured for selective communication with the smart apparatus; and
a memory accessible by the data processor and having stored therein
an apparatus control application configured to
receive and store user-defined criteria for changing the operational parameter based on a financial parameter associated with a bank account,
receive, from the financial institution via the network and the network communication interface, a value for the financial parameter,
determine whether the user-defined criteria have been met, and
responsive to a determination that the user-defined criteria have been met, transmit to the smart apparatus, an instruction to change the operational parameter,
wherein the user-defined criteria include at least one of the set consisting of a first specification that a date associated with the financial parameter falls within a predetermined date range and a second specification that a date associated with the financial parameter does not fall within a predetermined date range prior to a date of an upcoming deposit into the bank account.

17. A mobile control device according to claim 16 wherein the apparatus control application is further configured to after a determination has been made that the user-defined criteria have been met, receive, from the financial institution via the network and the network communication interface, a second value for the financial parameter, determine whether the user-defined criteria are still being met, and responsive to a determination that the user-defined criteria are no longer being met, transmit to the smart apparatus, a second instruction to change the operational parameter.

* * * * *